(12) United States Patent
Hanrieder et al.

(10) Patent No.: US 7,058,175 B2
(45) Date of Patent: Jun. 6, 2006

(54) DIGITAL SWITCHING SYSTEM WITH SHARED ANALOG LINE

(75) Inventors: Paul A. Hanrieder, Calgary (CA); William Sung, Calgary (CA); Kevin W. Golka, Kanata (CA); Steven J. Rhodes, Nepean (CA); Richard G. Martin, Hull (CA); Jeffrey Jay McIntosh, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/883,467

(22) Filed: Jul. 1, 2004

(65) Prior Publication Data

US 2005/0058271 A1    Mar. 17, 2005

Related U.S. Application Data

(62) Division of application No. 09/392,659, filed on Sep. 9, 1999, now Pat. No. 6,771,773.

(51) Int. Cl.
*H04M 1/00* (2006.01)
*H04M 3/00* (2006.01)
*H04M 11/00* (2006.01)

(52) U.S. Cl. .............. 379/413.02; 379/242; 379/93.07; 379/106.08

(58) Field of Classification Search .. 379/93.05–93.07, 379/106.06, 106.08, 207.04–207.07, 242, 379/243, 413.02
See application file for complete search history.

(56) References Cited

U.S. PATENT DOCUMENTS

| | | | |
|---|---|---|---|
| 3,403,383 A | 9/1968 | Kienzle et al. | |
| 4,286,119 A | 8/1981 | Stelte et al. | |
| 4,293,738 A | 10/1981 | Stelte et al. | |
| 4,435,803 A * | 3/1984 | Das et al. | 370/228 |
| 4,967,408 A | 10/1990 | Phan | |
| 5,150,357 A | 9/1992 | Hopner et al. | |
| 5,305,312 A * | 4/1994 | Fornek et al. | 370/264 |
| 5,381,462 A | 1/1995 | Larson et al. | |
| 5,422,939 A | 6/1995 | Kramer et al. | |
| 5,671,251 A * | 9/1997 | Blackwell et al. | 375/222 |
| 6,343,126 B1 * | 1/2002 | Stelman | 379/399.01 |
| 6,693,997 B1 * | 2/2004 | Suffern et al. | 379/93.28 |
| 6,839,425 B1 * | 1/2005 | Huang et al. | 379/399.01 |

* cited by examiner

*Primary Examiner*—Benny Quoc Tieu
(74) *Attorney, Agent, or Firm*—Erik Fako

(57) ABSTRACT

An auxiliary connection mechanism for allowing a Digital Switching System (DSS) to share an analog line with an analog device (via an auxiliary device port) is disclosed. The auxiliary connection mechanism includes a pair of relays for releasably connecting the auxiliary device port and the DSS to the analog line. When the analog line is idle, both the analog device and the DSS are connected to the line in order to receive incoming calls on the analog line. However, once one of the devices (either the analog device or the DSS) uses the line, the other device should not access the line. A busy line detect circuit is included to detect whether a device is using the line.

20 Claims, 1 Drawing Sheet

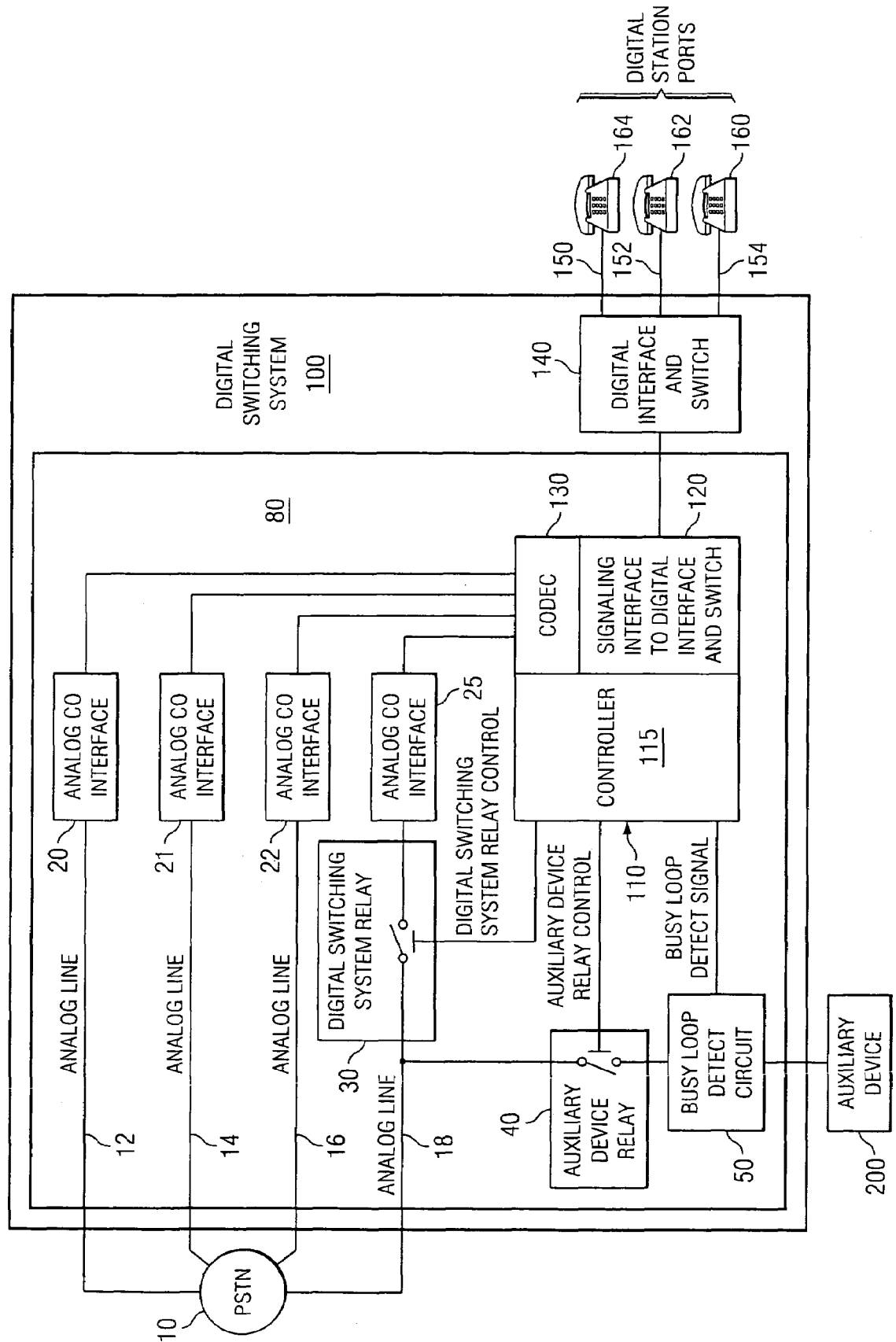

DIGITAL SWITCHING SYSTEM WITH SHARED ANALOG LINE

CROSS-REFERENCE TO RELATED APPLICATIONS

This application is a divisional of prior application U.S. Ser. No. 09/392,659 filed on Sep. 9, 1999, now U.S. Pat. No. 6,771,773 which is hereby incorporated by reference.

FIELD OF THE INVENTION

The present invention relates to using analog devices with digital switching systems (DSS), for example Digital private branch exchanges (PBXs) and digital Key System Units (KSUs), which provide connections to digital devices.

BACKGROUND TO THE INVENTION

A digital switching system is typically used by an organization for facilitating both internal communications within the organization and also communication with the outside world. These devices are often called Customer Premise Equipment (CPE), as the organization is typically a customer of the public telephone company. A DSS switches internal connections, such that a plurality of digital sets each connected to the DSS can communicate with each other, and also with the outside world via outside connections. A typical DSS will have outside connections which comprise analog connections to a central office (CO) switch for communication with the outside world via the Public Switched Telephone Network (PSTN), and connections to local digital telephone sets. Such a DSS allows a plurality of digital devices to share one or more analog lines. The DSS will convert between analog signals carried by the analog lines and digital signals used by the digital sets.

A DSS will typically only support digital devices. There are known advantages gained by using digital sets. However, one disadvantage of such a DSS is that analog devices, for example facsimile (fax) devices, modems, and analog telephones are not compatible with digital switching systems.

In the past, one way of using such an analog device was to have a dedicated analog line to the CO for use by the analog device. However, this has the disadvantage of being expensive to the customer, who has to pay for a dedicated line that will be underutilized, as the device is typically not used on a constant basis. Furthermore, as the line is dedicated, it can not be shared with other devices when the analog device is not using the line.

One prior art solution was to use an Analog Terminal Adapter (ATA). This is a device which is compatible with the DSS, and is considered by the DSS to be a digital device connected to the DSS. The ATA includes an analog line interface circuit which includes Digital to Analog converters for converting between digital and analog signals, as well as providing supervision (e.g., ringing voltage, off hook detection, etc.) to the analog device. Such a device is expensive and also has the disadvantage of not providing a true analog interface to the CO. Signal degradation can occur due to the combination of A/D conversion in the DSS and then D/A conversion in the ATA (and vice a versa). A user of an analog POTS (Plain Ordinary Telephone Service) telephone is unlikely to notice any effects arising from this double conversion. However, other analog devices, such as high speed modems (e.g., 56 Kilobit/second modems) will suffer signal degradation, which is unacceptable for data transmission and results in a decrease in data transmission rate. Furthermore, such a solution will not function in the event of a power failure (or at least will not function without battery backup).

Other prior art solutions include emergency transfer relay for connecting a POTS telephone to an analog line in the event of a power failure. Such a solution provides fall back to POTS in a relatively cheap manner, but does not allow for the use of a fax or modem. Furthermore, a call made during a power failure will be automatically disconnected when the DSS powers up and grabs the line.

Therefore, there exists a need for a system which will allow an analog device to share an analog line with a DSS which overcomes these problems in a cost effective manner.

SUMMARY OF THE INVENTION

An object of the present invention is to provide an auxiliary connection mechanism for allowing a Digital Switching System (DSS) to share an analog line with an analog device (via an auxiliary device port). Both the analog device and the DSS should be able to receive incoming calls on the analog line. However, once one of the devices (either the analog device or the DSS) uses the line, the other device should not access the line.

Thus there is provided an auxiliary connection mechanism for releasably connecting both the auxiliary device port and the DSS to the analog line. Both the auxiliary device port and the DSS are connected to the analog line when the line is idle, so both the auxiliary device port and the DSS can receive incoming calls. A busy line detection circuit is included to detect whether the line is being used. A controller monitors the status of the analog line and controls access to the analog line, in order to prevent the auxiliary device and the DSS from using the analog line at the same time.

Such an auxiliary connection mechanism is preferably integrated with the DSS. However, in one embodiment, the auxiliary connection mechanism comprises a separate box interposed between the analog line and the DSS.

In accordance with a broad aspect of the present invention there is provided a digital switching system comprising:
  at least one analog interface for connecting to at least one analog line;
  a digital interface for connecting to a plurality of digital lines;
  a switching mechanism connected between said at least one analog interface and said digital interface for making connections between said at least one analog line and said digital lines;
  an auxiliary device port;
  an auxiliary connection mechanism for connecting said auxiliary device port to said at least one analog line including: a first connection for connecting said analog line to said analog interface, and a second connection for connecting said analog line to said auxiliary device port.
  a controller for controlling the states of said connections.

According to a further aspect of the invention which provides a supervised emergency transfer feature, the controller checks the status of the busy line circuit upon power up prior to providing the switching mechanism with access to the analog line, and does not provide said access while said analog line is in use by a device connected to said auxiliary device port.

According to another aspect of the invention there is provided an auxiliary connection mechanism for connecting an analog line to either a digital switching system (DSS) or an analog device port, said auxiliary connection mechanism comprising:
  a first switch for connecting said analog device port to said analog line;
  a second switch for connecting said digital switching system to said analog line;

a controller for controlling said switches so that both the digital switching system and said analog device port are connected to said analog line when said analog line is idle, and for disconnecting one of said switches when the other device uses the line.

BRIEF DESCRIPTION OF THE DRAWINGS

The present invention, together with further objects and advantages thereof will be further understood from the following description of the preferred embodiments with reference to the drawings in which:

FIG. 1 illustrates a digital switching system supporting an analog device according to an embodiment of the invention.

DETAILED DESCRIPTION OF THE PREFERRED EMBODIMENTS

FIG. 1 illustrates a digital switching system (DSS) supporting an analog device according to an embodiment of the invention. In this embodiment the DSS 100 is shown to include a trunk interface unit 80 connected to a Digital Interface and Switching mechanism 140 (e.g., the core switching system of a PBX or of a digital key system unit). The Digital Interface and Switching mechanism 140 is connected via digital lines 150, 152 and 154 to digital devices, for example digital telephone sets 160, 162 and 164. The trunk interface 80 provides for 4 analog connections (via analog lines 12, 14, 16, and 18) to a PSTN Central Office (CO) Switch 10. Analog lines 12, 14 and 16 are each connected to an Analog CO Interface 20, 21, and 22. The Analog CO Interface performs several functions, including isolation, ring detection, dc sinking, loop current detection, loop termination, loop supervision and disconnect supervision.

In this embodiment of the invention, analog line 18 is shared between the DSS and an auxiliary device, for example a fax, analog modem, or POTS telephone, connected to the auxiliary device port 200. Thus an auxiliary connection mechanism is connected to analog line 18, which then in turn connects to Analog CO Interface 25. The auxiliary connection mechanism includes a first relay 30 (labeled as DSS relay) for connecting the analog line 18 to the Analog CO interface 25 and a second relay 40 (labeled as Auxiliary device relay) for connecting the analog line 18 to the auxiliary device port 200 via a busy loop detect (BLD) circuit 50.

Each of the Analog CO Interfaces 20, 21, 22, and 25 are connected to the Digital/Analog interface unit 110 which is in turn connected to the Digital Interface and Switching mechanism 140. The Digital/Analog interface unit 110 includes a controller 115, a CODEC unit 130 for providing CODEC functions for each of the analog co interfaces, and a Signaling interface to DIS 120 which facilitates signaling between the digital interface and each of the analog interfaces.

The controller 115 includes a processor and associated memory for storing software instructions for controlling the unit as described. The controller 115 sends a control signal to the DSS relay 30 via the DSS Relay Control line in order to control the state of the DSS relay 30. The relay has two states: closed, when the analog line 18 is connected to the analog interface 25, and open, when the analog line is not connected to the analog interface 25. Similarly, the controller 115 sends a control signal to the Auxiliary Device relay 40 via the Auxiliary Device Control line in order to control the state of the Auxiliary Device relay 40. The controller also receives a control signal (the BLD signal) from the Busy Loop Detect (BLD) circuit 50. The BLD control signal allows the controller to monitor and control access to the analog line 18, in order to prevent the auxiliary device and the DSS from using the analog line 18 at the same time. The controller 115 preferably also receives a control signal/message from the Digital interface and switching system 140 when the digital system is using the line. The controller also sends control signals to the Digital interface and switching system 140 when the controller changes the status of the DSS relay 30 (i.e., when the auxiliary device uses, or ceases to use the analog line). This control signal informs the DIS 120 whether the line 19 can be used by the DIS 120 (i.e., whether the line is in use).

The controller 115 controls the states of the relays such that the analog line 18 is connected to both the auxiliary device port 200 and the analog interface 25 when the analog line 18 is idle. In other words both the DSS relay 30 and the Auxiliary Device relay 40 are closed when the analog line 18 is idle. Both relays are closed so that both the auxiliary device and the analog interface 25 can receive an incoming call on the analog line 18. Furthermore, the controller controls the states of the relays such that the analog line is switched between:

connecting to the auxiliary device port 200 when the auxiliary device port uses the analog line (in which case relay 40 is closed and relay 30 is open), and connecting to the analog interface 25, when the switching system 140 (via the analog interface) uses the analog line (in which case relay 30 is closed and relay 40 is open).

Advantageously, such a system can also be used to provide a supervised emergency transfer (ET) feature in the event of a power failure. Normally, if there is a power failure (and any battery backup has been depleted), the DSS will cease to operate. However, an analog phone connected to an analog line will still function as it draws power from the CO. Therefore, the system is preferably configured so that the DSS relay 30 is open and the Auxiliary device relay 40 is closed in the event of a power failure. In other words the PRX relay 30 has a default position (i.e., an un-energized state) of open and the auxiliary device relay 40 has a default position of closed. Furthermore, this ET feature is "supervised ET" as the DSS determines whether the analog line is being used upon power up (based on the BLD signal from BLD circuit 50). If the ET phone is on a call during power up then the controller will not connect relay 30 to line 18 and will not allow calls to be made on line 18 by the DSS. Once the ET call is finished, then the controller will connect the DSS to the analog line, by closing relay 30 and sending a message to the DIS allowing calls to be made on this line.

The controller determines whether the auxiliary device is using the analog line depending on the BLD signal received from the BLD circuit 50. The nature of this signal changes when an auxiliarly device changes state from off-hook to on-hook, and vice a versa. The BLD detects these state transitions by detecting changes in the voltage and current characteristics of the analog line. For example, the BLD will detect current being drawn by the auxiliary device when the auxiliary device goes off hook. For example, the output of the BLD circuit will be a +5V when the auxiliary device is on-hook (idle) and 0V when the auxiliary device is off-hook (in use).

Preferably, the controller uses debounce timers when reacting to the BLD signal to ensure that the state change is valid and to avoid conflicts. The state changes on the auxiliary device that require debouncing are on-hook to off-hook transitions and off-hook to on-hook transitions. Default times will be described, but both of these debounce times are preferably programmable by the DSS. The on-hook to off-hook debounce time is used to ensure that the auxiliary device has made a valid on-hook to off-hook transition. The default time for this timer is 200 ms. The off-hook to on-hook debounce time is used to ensure that the auxiliary device has made a valid off-hook to on-hook state change. The default time for this timer is 1500 ms. A 1500 ms default time is chosen because it is longer than a nominal hook flash signal which the auxiliary device can use.

Note that we have described a system with 4 analog lines 12, 14, 16 and 18, with the auxiliary connection mechanism coupled to line 18 only. Of course additional lines can be supported by the DSS, and if desired, additional auxiliary connection mechanisms can be coupled to more than one of the incoming PSTN lines. Furthermore, although line 18 needs to be an analog line, the DSS can have different PSTN connections for some or all or its other lines, for example ISDN or T1 connections.

Note that we have described the auxiliary connection mechanism using relays for switching. However it should be appreciated by a person skilled in the art that other equivalent switching mechanisms can be used, for example, analog switches, solid state relays, optocouplers, etc. Preferably the switching mechanism will provide both switching and isolation (for safety purposes). Furthermore, we have described the controller 115 as comprising a processor and associated memory for storing software instructions for operating as described. However the controller could alternatively comprise an ASIC or FPGA or discrete circuitry.

Furthermore, some of the functions described as carried out by the controller 115 can alternatively be carried out by a controller (not shown) associated with the Digital Interface and Switch 140. Furthermore, the Digital/Analog interface unit 110 can form part of the Digital Interface and Switch 140.

As another alternative, we have assumed that the controller 115 receives a control message from the Digital Interface and Switch 140 when it is connecting the analog line to a digital device, and thus using the line. Alternatively, an additional BLD circuit can be used to detect when the analog line is being used by the digital system, for example by detecting current being drawn by the analog interface 25.

As described, if the analog line is in use by one device (either the auxiliary device or the analog interface/DSS) than the other device is effectively disconnected from the analog line. As an optional feature (which adds complexity and cost), when a relay is opened, the "disconnected" device can be supplied with a busy tone, for example by being connected to a busy tone unit which includes a DC source and a busy tone generator.

As a further optional feature (which may be desirable in some circumstances), the digital switching system provides a feature whereby the analog interface 25 can be given priority over the auxiliary device port even when the auxiliary device is using the analog line. When a priority call feature is invoked, such as dialing a feature number and/or password on a digital station port, the DSS signals the controller to disconnect the auxiliary device and allow the analog interface to be connected. The controller disconnects the auxiliary device, waits for the off-hook to on-hook debounce time (default 1500 ms) to ensure the central office recognizes the disconnect, and then connects the analog interface 25 to the analog line.

We have described the system assuming the controller does two things once the controller detects the analog device is using the line:

i) tell the DSS the line is in use and not to use the line ii) open the DSS relay, so the DSS can not use the line.

It should be noted that although only step (i) is necessary in order to prevent both devices from using the line at the same time, it is preferable to do both steps. It is preferable to perform (ii) as noise, balance, impedance, and loading caused by having the analog interface circuit bridged on the analog line could adversely affect the performance of the auxiliary analog device, especially for high-speed modems.

In an alternative embodiment, the auxiliary connection mechanism need not be integrated with the DSS, but can form a separate box interposed between the analog line 18 and the DSS connection to the analog interface 25. In this embodiment, the ACM can co-operate with the DSS (if both are designed to connect to each other and send the required control messages) and operate in much the same way as the system described above. In a less preferred embodiment such a separate box can be used without any change to an existing DSS. In this case, a second BLD circuit will be required, and the unit will require its own control mechanism (which can be a processor with associated memory or discrete logic circuit for controlling the relays based on inputs from the two BLD circuits). Such a system can prevent both the DSS and the auxiliary device from using the analog line at the same time. However, such an independent system will not be as robust as the integrated system as the DSS will not know the analog line is in use by an auxiliary device (other than finding it has been disconnected to the analog line). Including the optional feature described above can in some part alleviate this disadvantage.

Numerous modifications, variations and adaptations may be made to the particular embodiments of the invention described above without departing from the scope of the invention, which is defined in the claims.

What is claimed is:

1. A digital switching system comprising:
   at least one analog interface for connecting to at least one analog line;
   a digital interface for connecting to a plurality of digital lines;
   a switching mechanism connected between said at least one analog interface and said digital interface for making connections between said at least one analog line and said digital lines;
   an auxiliary device port;
   an auxiliary connection mechanism for connecting said auxiliary device port to said at least one analog line including: a first connection operable in a first state for connecting said analog line to said analog interface and operable in a second state for disconnecting said analog line from said analog interface, and a second connection operable in a first state for connecting said analog line to said auxiliary device port and operable in a second state for disconnecting said analog line from said auxiliary device port; and
   a controller for controlling the states of said connections.

2. The digital switching system as claimed in claim 1 wherein said first connection includes a first relay and said second connection includes a second relay such that said analog line can be switched between:
   connecting to said auxiliary device port,
   connecting to said analog interface, and
   connecting to both said auxiliary device port and said analog interface.

3. The digital switching system as claimed in claim 1 wherein said first connection includes a first relay and said second connection includes a second relay and said controller controls said relays such that said analog line is connected to both said auxiliary device port and said analog interface when said analog line is idle and said analog line is switched between:
   connecting to said auxiliary device port when said auxiliary device port uses said analog line, and
   connecting to said analog interface, when said switching mechanism uses said analog line.

4. The digital switching system as claimed in claim 3 wherein said controller includes means for determining whether said analog line is in use prior to allowing switching of said connections.

5. The digital switching system as claimed in claim 3 wherein said auxiliary connection mechanism further includes a busy line circuit for sending a control signal to said controller when said analog line is in use by an analog device connected to said auxiliary device port.

6. The digital switching system as claimed in claim 5 wherein said controller, upon receiving said control signal, prevents said switching mechanism from attempting to connect said analog line to a digital line.

7. The digital switching system as claimed in claim 6, wherein said controller waits a period of time once a transition is detected prior to switching said connections.

8. The digital switching system as claimed in claim 6, wherein said controller checks the status of the busy line circuit upon power up prior to providing the switching mechanism with access to the analog line.

9. The digital switching system as claimed in claim 6, wherein said auxiliary connection mechanism further comprises a busy tone unit including a DC source and busy tone generator which is connected to a connection when the relay of said connection is open.

10. The digital switching system as claimed in claim 6, wherein the controller, upon receiving a priority call feature message from the switching mechanism, connects the switching mechanism to the analog line and disconnects the auxiliary device port from the analog line.

11. The digital switching system as claimed in claim 1 wherein said auxiliary connection mechanism further includes a busy line circuit for sending a control signal to said controller when said analog line is in use by an analog device connected to said auxiliary device port and wherein said controller, upon receiving said control signal, sends a message to the switching mechanism preventing the switching mechanism from using said analog line while said analog line is in use by said analog device.

12. A digital switching system comprising:
an analog interface for connecting to at least one analog line;
a digital interface for connecting to a plurality of digital lines;
means, coupled between said analog interface and said digital interface for connecting said analog line and one of said plurality of digital lines;
an auxiliary device port;
an auxiliary connection mechanism for connecting said auxiliary device port to said analog line, the auxiliary connection mechanism further comprising,
a first connection operable in a first state for connecting said analog line to said analog interface and operable in a second state for disconnecting said analog line from said analog interface, and
a second connection operable in a first state for connecting said analog line to said auxiliary device port and operable in a second state for disconnecting said analog line from said auxiliary device port; and
a controller for controlling the states of said connections.

13. The digital switching system as claimed in claim 12 wherein said first connection includes a first switch and said second connection includes a second switch such that said analog line can be switched between a one of:
connecting to said auxiliary device port,
connecting to said analog interface, and
connecting to both said auxiliary device port and said analog interface.

14. The digital switching system as claimed in claim 12 wherein said first connection includes a first switch and said second connection includes a second switch and said controller controls said switches such that said analog line is connected to both said auxiliary device port and said analog interface when said analog line is idle, said analog line is connected to said auxiliary device port when said auxiliary device port uses said analog line, and said analog line is connected to said analog interface when said switching mechanism uses said analog line.

15. The digital switching system as claimed in claim 14 wherein said controller comprises means for determining whether said analog line is in use prior to allowing switching of said connections.

16. The digital switching system as claimed in claim 14 wherein said auxiliary connection mechanism further comprises a busy line circuit for sending a control signal to said controller when said analog line is in use by an analog device connected to said auxiliary device.

17. A digital switching system, comprising:
an analog interface for connecting to at least one analog line;
a digital interface for connecting to a plurality of digital lines;
means, coupled between said at least one analog interface and said digital interface, for connecting said at least one analog line and one of said plurality of digital lines;
an auxiliary device port; and
an auxiliary connection mechanism, comprising, means for preventing both said auxiliary device port and said analog interface from using said analog line at the same time.

18. A digital switching system as claimed in claim 17 wherein the means for preventing further comprises:
first means for connecting said auxiliary device port to said analog line;
second means for connecting said analog interface to said analog line;
means for controlling said first and second means for connecting such that both said analog interface and said auxiliary device port are connected to said analog line when said analog line is idle, and for disconnecting one of said analog interface and said auxiliary device port when the other of said analog interface and said auxiliary device port uses said analog line.

19. A digital switching system as claimed in claim 17 further comprising a busy line detector for determining whether said auxiliary device port is using said analog line.

20. A digital switching system as claimed in claim 19 further comprising a second busy line detector for determining whether said analog interface is using the line.

* * * * *